July 17, 1923.

S. I. NEHER 1,462,022

CULTIVATOR ATTACHMENT FOR TRACTORS

Filed July 29, 1921      3 Sheets-Sheet 1

Inventor
SAMUEL I. NEHER

By

Attorney

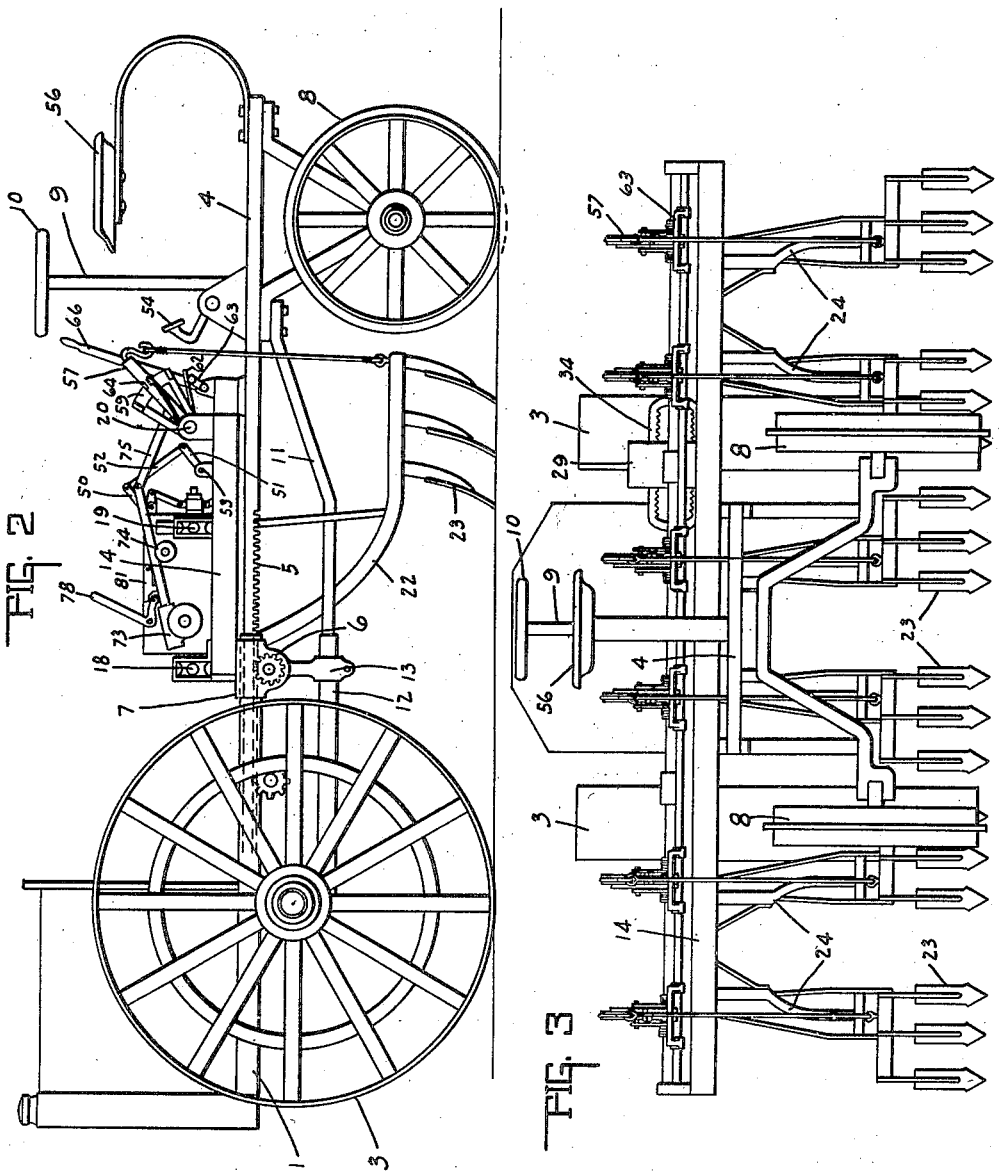

July 17, 1923.

S. I. NEHER 1,462,022

CULTIVATOR ATTACHMENT FOR TRACTORS

Filed July 29, 1921

3 Sheets-Sheet 3

Inventor
SAMUEL I. NEHER
By
Attorney

Patented July 17, 1923.

1,462,022

UNITED STATES PATENT OFFICE.

SAMUEL I. NEHER, OF KEYSTONE, INDIANA.

CULTIVATOR ATTACHMENT FOR TRACTORS.

Application filed July 29, 1921. Serial No. 488,426.

*To all whom it may concern:*

Be it known that I, SAMUEL I. NEHER, a citizen of the United States, residing at Keystone, in the county of Wells and State of Indiana, have invented certain new and useful Improvements in Cultivator Attachments for Tractors, of which the following is a specification.

This invention relates to cultivator attachments for tractors, and the prime feature of the invention is the provision of means in connection with a tractor for utilizing the driving power for the tractor for raising and lowering the cultivator attachments, and for positioning the same laterally with respect to the frame structure from which the cultivators are suspended.

A further feature of the invention is the provision of means for controlling and guiding the tractor from the cultivator attachment.

A further feature of the invention is the provision of means for increasing or decreasing the distance of the frame carrying the cultivating parts with respect to the tractor proper, when the cultivating parts are removed.

A further feature of the invention is the provision of means for yieldingly suspending the cultivator attachments from the frame portion of the device.

Other objects and advantages will be hereinafter more fully set forth and pointed out in the accompanying specification.

Figure 1:
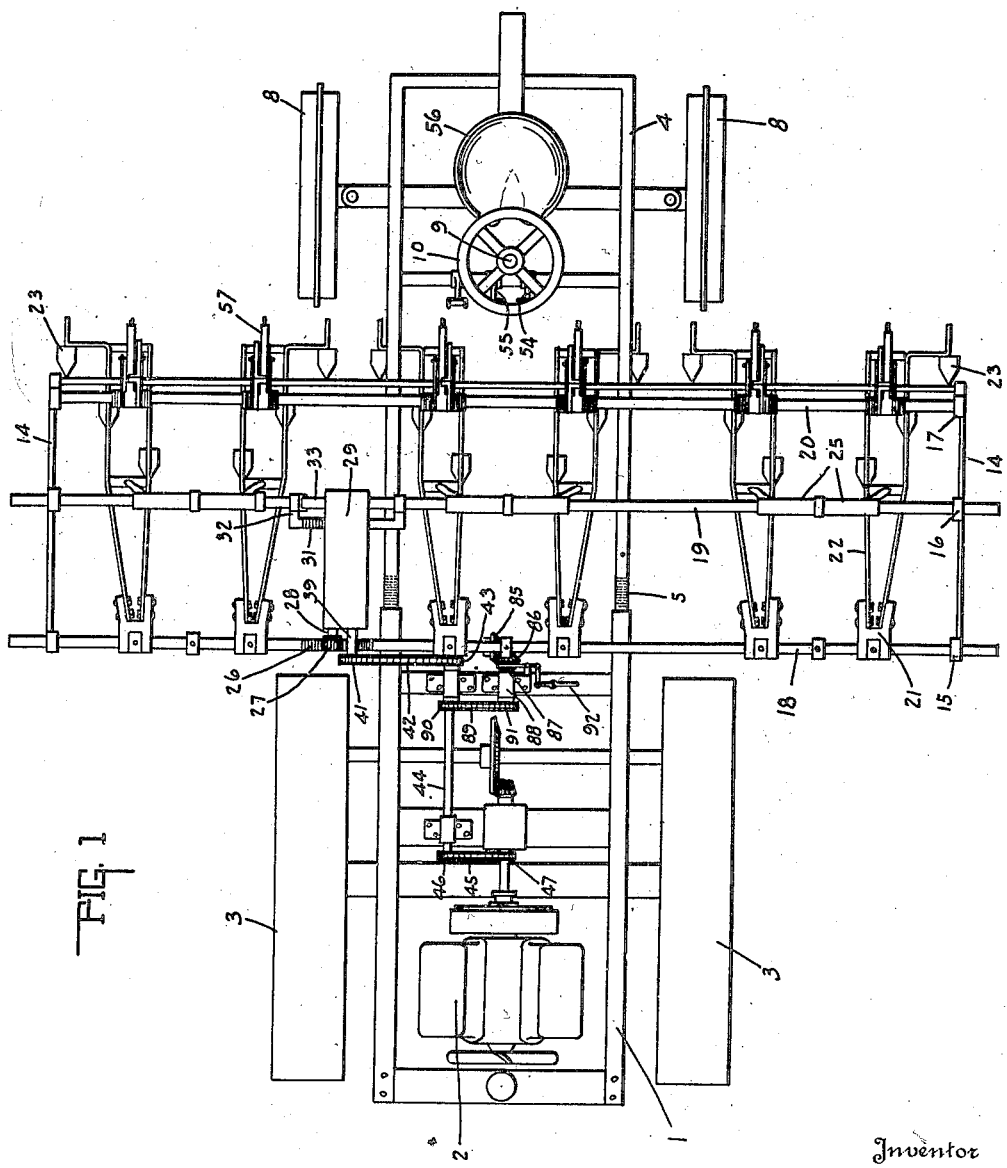
Figure 4:
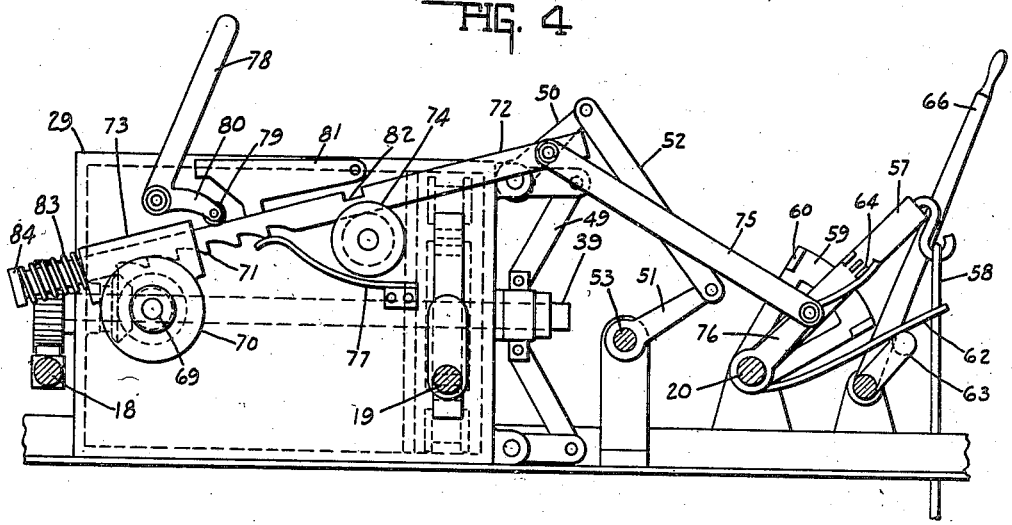
Figure 5:
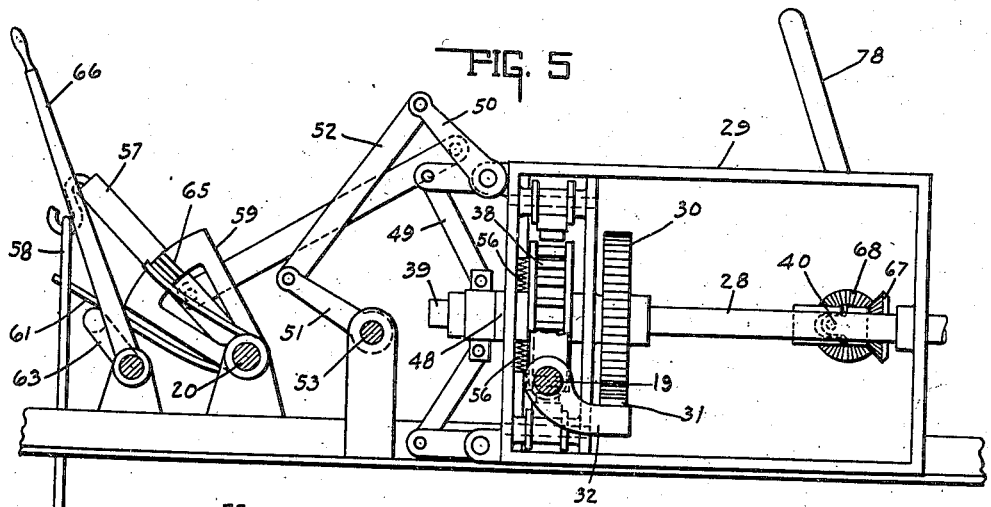
Figure 6:
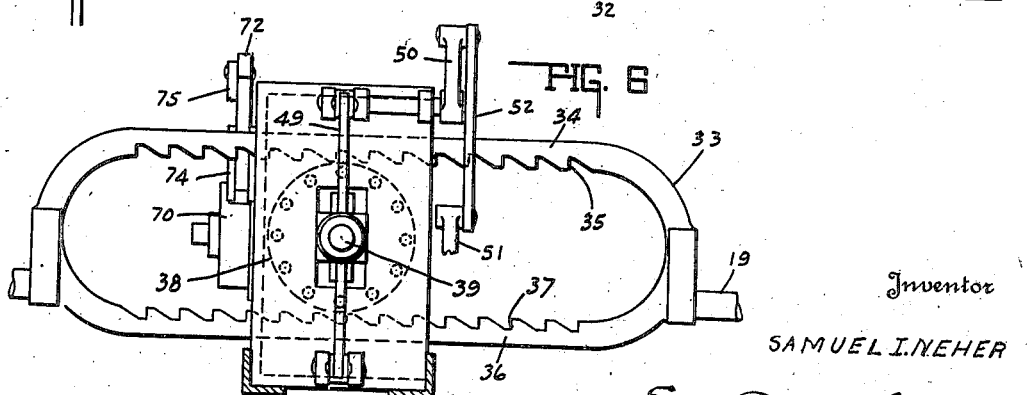

In the accompanying drawings,

Fig. 1 is a top plan view of the combined cultivator and tractor,

Fig. 2 a side elevation thereof,

Fig. 3 a rear end elevation,

Fig. 4 an enlarged detail elevation of parts of the controlling mechanism for the cultivator, Fig. 5 a similar view showing the opposite side of the mechanism disclosed in Fig. 4, and Fig. 6 is an end elevation of parts of the shifting mechanism with parts broken away.

Referring to the drawings in which similar reference numerals designate corresponding parts throughout the several views, 1 indicates the frame portion of a tractor which may be of any preferred construction, 2 the motor mounted thereon, and 3 the driving wheels for the tractor.

The side bars of the frame 1 are preferably hollow and receive the inner ends of an extension frame 4, said extension frame being provided with racks 5, with which co-operate pinions 6, supported from clamping members 7 mounted adjacent the rear ends of the side bars of the frame member 1, and by rotating the pinions 6, the frame 4 and parts carried thereby may be moved towards or from the tractor proper. Supporting the rear end of the frame are guide wheels 8, which are operated in any suitable manner through the medium of a steering column and hand wheel 10, and when the tractor is to be used independently of the cultivating mechanism, the cultivating mechanism is removed and the frame 4 moved forwardly and telescoped with the frame 1 of the tractor; and in order to properly brace the frame 4, a brace rod 11 is connected at one end to the frame 4, while the opposite end thereof is entered in a hollow brace rod 12 on the tractor proper, an arm 13 being extended downwardly from the clamping member 7 for supporting the rear end of the member 12.

Mounted upon the frame 4 is a rectangular shaped frame 14, extending upwardly from which are brackets 15, 16 and 17, and through said brackets are extended shafts 18, 19 and 20, the shafts 18 and 19 being longitudinally movable through their respective brackets. Adjustably and pivotally secured to the shaft 18 are a plurality of heads 21, to which are connected beams or shanks 22 of the usual or any preferred construction, to the rear free ends of which are connected cultivating shovels 23, which are likewise of any suitable size and shape, the sets of beams being arranged in pairs, so that each pair will position on opposite sides of a row of growing plants, and in the present instance three sets of the cultivators are shown, so that three rows of plants may be cultivated at the same time. Each pair of beams 22 is supported from the shaft 19 by means of arches 24, the upper ends of the arches being connected with sleeves 25 which surround the shaft 19, and their meeting ends are swivelly connected together in any suitable manner, so that one beam or gang may have independent swinging movement upwardly from the other, but the pairs of gangs will be caused to move in unison laterally, the arches also serving to cause the pairs of beams to travel in proper spaced relation from each other. The shafts 18 and 19 are shifted longitudinally for properly positioning the pairs of cultivator attachments with respect to the rows of plants being cultivated, and power is derived from the motor employed for driving the tractor for shifting these shafts, the shaft 18 having teeth 26 thereon, co-operating with which is a pinion 27 mounted upon a shaft 28, said shaft extending horizontally through a housing 29, and having a gear 30 on its inner end, which engages a rack 31 connected to the shaft 19 by means of laterally extending arms 32 at its ends.

In the length of the shaft 19 is formed a loop shaped rack bar 33, the upper horizontal portion 34 thereof having a plurality of teeth 35 arranged for engagement from one direction, with a pinion gear 38 while the lower portion 36 is provided with teeth 37, arranged for engagement with the pinion gear from the opposite direction. The pinion gear 38, is mounted on one end of a shaft 39, and the end of said shaft is to be raised or lowered for engaging the gear with either set of teeth 35 or 37. The shaft 39 extends forwardly through the housing 29, and is provided in its length with a universal joint 40, so that the gear 38 may be readily raised or lowered without interfering with the operation of the shaft. The forward end of the shaft 39 is extended through the forward end of the housing 29, and has a sprocket wheel 41 connected therewith, around which passes a sprocket chain 42, the opposite end of said chain extending around a sprocket 43 on a driving shaft 44, the shaft 44 being rotatably mounted upon parts of the frame of the tractor, and connected with the driving shaft of the motor 2 through the medium of a sprocket chain 45, and sprockets 46 and 47; consequently the gear 38 is driven direct from the motor employed for driving the tractor.

In order to shift the shafts 18 and 19 laterally and thereby change the position of the gangs with respect to the rows of plants being cultivated, the rear end of the shaft 39 is raised or lowered until gear 38 engages either the teeth 35 or 37, and when the teeth 35 are engaged the loop 38 and the shaft 19 will be moved lengthwise to the left, and as the rack 31 is fixed to the shaft 19 the gear 30 will be rotated with the movement of said shaft and through the shaft 28, pinion 27 and teeth 26, the shaft 18 will be moved in the same direction and co-incident to the movement of the shaft 19.

For moving the shafts in the opposite direction, the gear 38 is lowered until it engages the teeth 37, which results in moving the shaft 19 to the right, and through the gear 30 shaft 38 and pinion 27, the shaft 18 will be shifted to the right.

The rear end of the shaft 39 is entered through a sliding bearing 48, and connected with said bearing is a toggle lever construction 49, which is connected to one arm of a bell crank lever 50, and the opposite arm of the bell crank lever is connected with a crank arm 51 by means of a link 52, the crank arm being connected with a shaft 53, which is in turn operated in any suitable manner, as by means of foot pedals 54 or 55 arranged adjacent the driver's seat 56, mounted on the frame 4, the foot pedal 54 being employed for elevating the gear 38, while the foot pedal 55 is used for lowering the gear 38 into engagement with the teeth 37.

The shaft 39 and gear 38 are normally held suspended midway between the teeth of the loop shaped rack bar 33, and out of engagement with both sets of teeth 35 and 37, by means of coil springs 56, one above and one below the bearing 48, the tension of said springs being uniform, so that the gear will be normally centered between the upper and lower portions of the loop and held in that position until such time as the toggle shaped rack bar lever construction is operated for raising or lowering the gear. The beams or gangs 22 are suspended from supporting bars 57 by means of cables or the like 58, the supporting bars 57 being connected at one end with the shaft 20, and associated with each supporting bar is a guide frame 59, which is substantially in segmental formation and provided at its outer extremities with shoulders 60, so that the supporting bars 57 may have a limited movement independently of the guide frame 59.

The supporting bars 57 and the guide frame 59 are yieldingly suspended so as to yieldingly support the beams or gangs 22 by means of springs 61 and 62, said springs being arranged in pairs and on opposite sides of each set of guide frames and supporting bars, parts of the springs being coiled around the shaft 20, while one end of each spring rests against a tensioning bar 63, and the opposite ends thereof entered in projecting notches 64 and 65 on the supporting bars 57 and guide frames 59, respectively.

The tensioning bar 63 is controlled for increasing or decreasing the tension of the springs 61 and 62 by means of a lever 66, and additional tension on the springs may be obtained by shifting the position of the ends of the springs engaging with the projecting notches 64 and 65. By this form of construction the gangs are not only yieldingly supported, but the depth to which they will enter the soil may be readily regulated through the medium of the tensioning springs and parts associated therewith.

In order to employ power from the motor for automatically raising the gangs from engagement with the soil, a bevel gear 67 is attached to the shaft 39, which meshes with a similar gear 68, mounted upon a shaft 69 extending at right angles to the shaft 39 and through one wall of the housing 29, and on the projecting end of the shaft 69 is a gear 70 for engagement with teeth 71 on an operating bar 72, one end of the bar passing through a casing 73, while the opposite end thereof passes over a guide pulley 74, the casing 73 being so formed that it will extend over the faces of the gear 70, and is attached in any suitable manner to the side of the housing 29.

The longitudinal movement of the operating bar 72 in one direction is utilized for swinging the guide frames 59 and the supporting bars 57 upwardly for raising the gangs out of engagement with the soil, through the medium of a link 75, one end of which is pivoted to one end of the operating bar 72, and the opposite end to a crank arm 76 fixed to the shaft 20. The free end of the operating bar 72 is vertically movable in the casing, so that the teeth 71 may be elevated out of the path of the teeth of the gear 70, and when so elevated said gear may freely rotate without operating the bar 72, a spring 77 being preferably employed for holding the operating bar 72 in an elevated position and out of engagement with the gear 70.

When it is desired to elevate the gangs, downward pressure is applied on the forward end of the operating bar 72, through the medium of a lever 78, which is pivoted to the housing 29 and has a trunnion 79 rotatably mounted in the laterally extending portion 80 of the lever 78, which trunnion engages the operating bar 72, thereby eliminating undue friction between these parts. As soon as the gangs have been elevated a proper distance, a latch 81 is dropped into engagement with a notch 82 in the upper face of the operating bar 72, thereby holding the gangs in elevated position until such time as the lever 78 is swung a sufficient distance in the opposite direction to release the latch from the notch 82, when the gangs will descend by gravity; and to prevent a jar against the end of the casing 73, a cushioning spring 83 is introduced around the operating bar 72, and between the end of the casing 73 and a head 84 on the end of the operating bar, said spring 83 cushioning the blow as the gangs descend.

The pinions 6 are operated for moving the frame 4 inwardly by mounting a bevel gear 85 on the shaft carrying the pinions 6, with which meshes a pinion 86 mounted on a stub shaft 87 at right angles to the shaft carrying the bevel gear 85, said shaft extending through a bearing 88 on parts of the frame structure 1. Power is applied to the shaft 87 through the medium of a sprocket chain 89, which passes around a sprocket gear 90 on the shaft 44, and around a similar sprocket 91 on shaft 87. As the shaft 44 is continually in operation when the tractor is being used, the gear 86 is disengaged from the gear 85 and held out of mesh therewith through the medium of a lever construction 92, which may be of any preferred construction.

In operation: supposing the device is being used for cultivating purposes, and it is desired to shift the positions of the cultivating gangs to the left, the driver applies pressure of his foot against the pedal 54, which elevates the gear 38 and engages the teeth thereof with the teeth 35, and as said gear is rotating, the shafts 18 and 19 will be moved lengthwise to the left the required distance, or until the gear 38 is lowered from engagement with the shoulders 35, while if the gangs are to be shifted in the opposite direction, pressure is applied to the foot pedal 55, which lowers the gear 38 into engagement with the shoulders 37.

Should it be desired to lift the gangs from engagement with the soil while the tractor is in operation, lever 78 is swung rearwardly, which lowers the trunnion 79 into engagement with the operating bar 72 and forces said bar downwardly until the shoulders 71 engage the teeth of the gear 70, and as said gear is constantly rotating the operating bar 72 will be moved lengthwise, and parts 57 and 59 operated to lift the gangs, the lifting movement of said gangs being continued until such time as the pressure of the trunnion is released from the bar or until the gear 70 moves out of engagement with the shoulders, which will automatically elevate the end of the bar 72. The latch 81 will then descend by gravity and hold the operating bar against longitudinal movement rearwardly, thereby holding the gangs in suspended or elevated positions until such time as the lever 78 is operated to disengage the latch from the notch in the bar 72.

When the cultivating attachment is disengaged from the frame 4 and the tractor is to be used for other purposes, the frame 4 is preferably coupled up shorter with the tractor so as to position the guide wheels nearer the tractor, and to employ the driving power of the engine for this purpose the bevel gear 86 is moved into mesh with the gear 85 through the medium of the lever mechanism 92; as soon as the frame 4 has been properly adjusted, gear 86 is again moved out of mesh with gear 85. The end of the frame 1 into which the end of the frame 4 is introduced is then preferably clamped around the parts of the frame 4, any suitable means for accomplishing the purpose being employed.

Having thus fully described my said invention, what I claim as new and desire to secure by Letters Patent, is:

1. The combination with a tractor having an extension frame supported from the ground of a second frame carried by the extension frame, shafts mounted on the second frame, cultivating attachments connected to said shafts, means for employing power from the driving means of the tractor for moving said shafts for changing the positions of the cultivating members, and additional means operated by the driving means of the tractor for elevating the cultivator attachments.

2. The combination with a tractor having a motor for driving the same, of a frame carried by said tractor, shafts on said frame rack bars connected to said shafts, a plurality of pairs of cultivating attachments connected with said shafts, a gear driven by said motor, means for raising or lowering said gear for moving the shafts lengthwise in either direction without reversing the rotation of said gear, means for controlling the movement of said shafts, means for yieldingly suspending the rear ends of the cultivator attachments from said frame, and means for utilizing the power of the motor for elevating said cultivators.

3. The combination with a tractor having a driving element, of a frame carried by the tractor, a pair of shafts movably mounted on said frame, a plurality of cultivating attachments connected with said shafts, means operable from the driving element of the tractor for moving said shafts endwise for changing the positions of the cultivator attachments, manually operated means for controlling the direction of movement of said shafts, and means operated from the driving element of the tractor for raising said cultivating attachments.

4. The combination with a tractor having a driving element thereon, of a plurality of cultivating attachments, means for connecting the forward ends of the cultivating attachments to parts of the tractor, a plurality of pivoted bars supporting the rear ends of said cultivating attachments, guide frames for operating said bars and guide frames for permitting limited movement of said bars independently of said guide frames, spring members associated with said supporting bars, and means for regulating the tension of the spring members.

5. The combination with a tractor having a driving element, of a frame carried by the tractor, a plurality of cultivating attachments, shafts carried by said frame from which said cultivating attachments are suspended, a gear driven by the driving element of the tractor, a loop shaped rack bar on one of said shafts having sets of teeth at the upper and lower edges thereof and positioned for engagement with opposite edges of said gear, means for raising or lowering said gear for engaging the same with one or the other of the sets of teeth, whereby said shaft may be moved lengthwise in either direction without reversing the rotation of said gear.

6. The combination with a tractor having a driving element, of a frame carried by the tractor, a plurality of cultivating attachments, shafts carried by said frame from which said cultivating attachments are suspended, a gear driven by the driving element of the tractor, a loop shaped rack bar on one of said shafts having sets of teeth at the upper and lower edges thereof and positioned for engagement with opposite edges of said gear, means for raising or lowering said gear for engaging the same with one or the other of the sets of teeth, whereby said shaft may be moved lengthwise in either direction without reversing the rotation of said gear, and additional racks and gears associated with the shaft carrying the loop shaped rack bar for operating the remainder of said shafts.

7. The combination with a tractor having a driving element, of a frame carried by said tractor, a shaft carried by the frame, a plurality of cultivating attachments suspended from said shaft, a gear driven by the driving element of the tractor, a toothed bar for co-operation with said gear, means for connecting said bar with said shaft, manually operated means for lowering the teeth of said bar into engagement with said gear for moving said bar lengthwise in one direction, for elevating said cultivating attachments, and means for normally retaining the teeth of said bar out of engagement with said gear.

8. The combination with a tractor having a driving element, of a frame carried by said tractor, a shaft carried by the frame, a plurality of cultivating attachments suspended from said shaft, a gear driven by the driving element of the tractor, a toothed bar for co-operation with said gear, means for connecting said bar with said shaft, manually operated means for lowering the teeth of said bar into engagement with said gear for moving said bar lengthwise in one direction, for elevating said cultivating attachments, means for normally retaining the teeth of said bar out of engagement with said gear, and means for locking said bar in its operated position for holding said cultivating attachments in elevated position.

In witness whereof, I have hereunto set my hand and seal at Keystone, Indiana, this 30th day of June, A. D. nineteen hundred and twenty-one.

SAMUEL I. NEHER. [L. S.]

Witnesses:
 EDWIN LOCKWOOD,
 AMOS R. WILLIAMS.